(12) United States Patent
Segrest, III

(10) Patent No.: US 6,273,286 B1
(45) Date of Patent: Aug. 14, 2001

(54) VENTILATING SYSTEM

(75) Inventor: E. Lawrence Segrest, III, Knoxville, TN (US)

(73) Assignee: Evergreen Custom Molding, Inc., Oak Ridge, TN (US)

( * ) Notice: Subject to any disclaimer, the term of this patent is extended or adjusted under 35 U.S.C. 154(b) by 0 days.

(21) Appl. No.: 09/548,099

(22) Filed: Apr. 12, 2000

(51) Int. Cl.⁷ .................................................. B65D 51/16
(52) U.S. Cl. ............................. 220/203.26; 220/203.28; 220/303
(58) Field of Search ..................... 220/203.13, 203.24, 220/203.26, 203.28, 303, DIG. 33, DIG. 32

(56) References Cited

U.S. PATENT DOCUMENTS

| | | |
|---|---|---|
| 4,280,529 | 7/1981 | Silvestri . |
| 4,440,308 | 4/1984 | Baker . |
| 4,498,493 | 2/1985 | Harris . |
| 4,553,559 | 11/1985 | Short, III . |
| 4,561,559 | * 12/1985 | Rutan et al. ............... 220/203.26 |
| 4,666,056 | 5/1987 | Kasugai et al. . |
| 4,676,390 | 6/1987 | Harris . |
| 4,785,961 | 11/1988 | Kasugai et al. . |
| 4,887,733 | 12/1989 | Harris . |
| 4,922,954 | 5/1990 | Blomquist et al. . |
| 4,944,425 | 7/1990 | Kasugai et al. . |
| 4,993,578 | 2/1991 | Kerby . |
| 5,052,571 | * 10/1991 | Susa et al. . |
| 5,145,083 | * 9/1992 | Takahashi . |
| 5,148,934 | 9/1992 | Kasugai et al. . |
| 5,174,463 | * 12/1992 | Scharrer ..................... 220/203.26 |
| 5,183,173 | 2/1993 | Heckman . |
| 5,203,466 | 4/1993 | Kasugai et al. . |
| 5,279,439 | 1/1994 | Kasugai et al. . |
| 5,540,347 | 7/1996 | Griffin . |
| 5,730,183 | 3/1998 | Kremsler . |
| 5,813,560 | 9/1998 | Weinberg et al. . |
| 5,845,800 | 12/1998 | Shaw et al. . |
| 5,992,670 | 11/1999 | Hagano et al. . |
| 5,996,829 | 12/1999 | Hagano et al. . |
| 6,003,709 | 12/1999 | Hagano et al. . |

\* cited by examiner

*Primary Examiner*—Nathan J. Newhouse
(74) *Attorney, Agent, or Firm*—Luedeka, Neely & Graham, P.C.

(57) ABSTRACT

According to the present invention, a ventilating system is used to equalize a first pressure within an enclosure, and a second pressure outside of the enclosure. The ventilating system includes a body member having an exterior surface adapted to seal against an inner surface of the enclosure. The body member has an interior surface forming a conical section oriented in a first direction. The ventilating system also includes an overpressure relief member for venting fluids from within the enclosure when the first pressure is greater than the second pressure. The overpressure relief member has an outside surface that forms a conical section oriented in the first direction. The overpressure relief member includes an outside surface that separates from the interior surface of the body member when the first pressure is greater than the second pressure. The outside surface of the overpressure relief member is designed to seal more tightly against the interior surface of the body member when the first pressure is less than the second pressure. The overpressure relief member also has an interior surface that forms a conical section oriented in a second direction. The ventilating system includes an underpressure relief member for receiving fluids into the enclosure when the first pressure is less than the second pressure. The underpressure relief member has an outside surface that forms a conical section oriented in the second direction. The outside surface of the underpressure relief member separates from the interior surface of the overpressure relief member when the first pressure is less than the second pressure. Moreover, the outside surface of the underpressure relief member is designed to seal more tightly against the interior surface of the overpressure relief member when the first pressure is greater than the second pressure.

20 Claims, 5 Drawing Sheets

VENTILATING SYSTEM

TECHNICAL FIELD

This invention relates to the field of ventilating enclosures. More particularly, this invention relates to a ventilating system for relieving underpressure and overpressure conditions in enclosures.

BACKGROUND OF THE INVENTION

Caps are used to seal containers for at least two reasons. First, for many applications it is desirable to keep unwanted materials or contaminants that are outside of the container from entering into the container, which thereby prevents the contents of the container from becoming contaminated. Second, it is important in some applications to prevent the contents of the container from escaping from the container, which thereby prevents contamination of the surrounding environment by the contents of the container.

Many container caps function as a plug or seal for the reasons discussed above. However, it is desirable in certain applications to allow various components to enter into the container, and conversely, to allow these same or other components to exit from the container. More specifically, a sealed container may develop a pressure imbalance with the surrounding environment, such as an underpressure or an overpressure condition within the container. Many caps are not vented and can not exhaust gases from or receive gases into the container to relieve the underpressure or overpressure condition in the container. This may create problems.

For example, an overpressured container with a ventless cap may burst. Thus, a ventless cap is not desirable for a gasoline tank, such as on a car, because the tank presents a safety hazard if it becomes pressurized and ruptures. On the other hand, a cap that vents continuously may allow an overabundance of volatile components to escape from the container into the surrounding environment. In this manner, either the valuable contents of the container are lost, or the surrounding environment is contaminated by the evaporating contents of the container. Thus, a continuously venting cap is not desirable for a gas tank, as the gas tends to evaporate and harm the surrounding atmosphere.

Thus, in some applications it is preferred to have a cap that vents only when necessary, and is sealed at other times. However, these caps tend to have other problems that prevent or discourage their use in some applications, such as on a gas tank, as mentioned above. For example, these types of caps are often constructed from more than one type of material or from materials that are not easily separated, adding complexity to the fabrication and manufacture of the caps. Additionally, the recycling process for such a cap tends to require extra steps to separate the different materials used to make the cap. These additional steps tend to make recycling the cap less attractive, due to the additional cost of material separation before recycling.

Thus, there is a need for a ventilating system composed of recyclable or readily separable components.

SUMMARY OF THE INVENTION

The foregoing and other needs are met by a ventilating system that equalizes a first pressure within an enclosure, such as a fuel reservoir, and a second pressure outside of the enclosure. The ventilating system includes a body member having an exterior surface adapted to seal against the enclosure. The body member has an interior surface forming a conical section. The conical section has a width, a first major diameter and a first minor diameter. The first major diameter and the first minor diameter of the conical section of the body member are oriented in a first direction relative to one another.

An overpressure relief member vents fluids, such as gas or air, from within the enclosure when the first pressure is greater than the second pressure. The overpressure relief member has an outside surface that forms a conical section having a width, a first major diameter and first minor diameter. The first major diameter and the first minor diameter of the overpressure relief member are also oriented in the first direction relative to one another. The outside surface of the overpressure relief member separates from the interior surface of the body member when the first pressure is greater than the second pressure. The outside surface of the overpressure relief member is designed to seal more tightly against the interior surface of the body member when the first pressure is less than the second pressure. The overpressure relief member also has an interior surface that forms a conical section having a width, a second major diameter, and a second minor diameter. The second major diameter and the second minor diameter of the conical section of the overpressure relief member are oriented in a second direction relative to one another.

The ventilating system further includes an underpressure relief member for receiving fluids, such as a gas, into the enclosure when the first pressure is less than the second pressure. The underpressure relief member has an outside surface that forms a conical section having a width, a second major diameter, and second minor diameter. The second major diameter and the second minor diameter of the underpressure relief member are oriented in the second direction relative to one another. The outside surface of the underpressure relief member separates from the interior surface of the overpressure relief member when the first pressure is less than the second pressure. Moreover, the outside surface of the underpressure relief member is designed to seal more tightly against the interior surface of the overpressure relief member when the first pressure is greater than the second pressure.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE INVENTION

Figure 1:
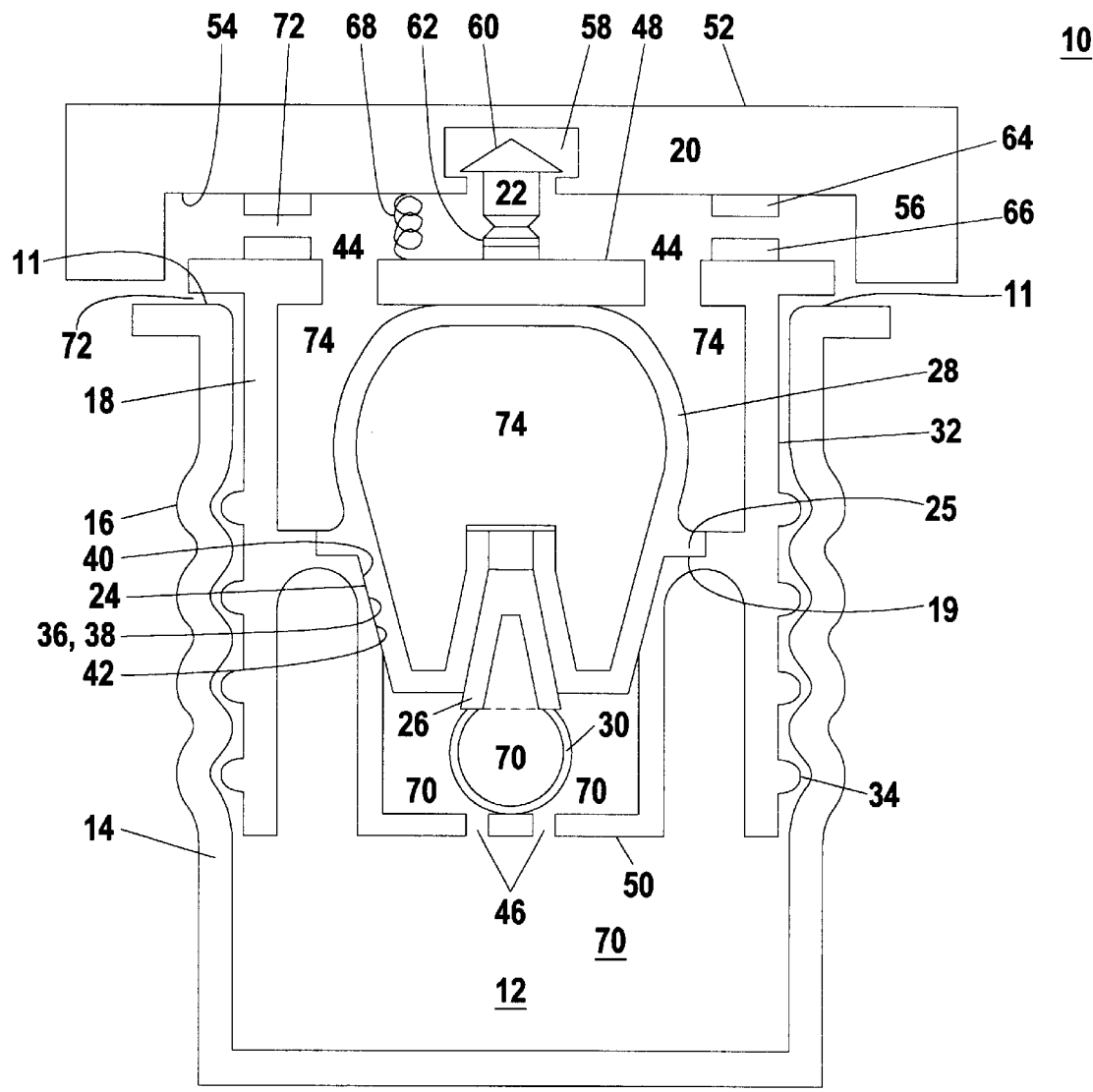
FIG. 1 is a cross-sectional side view of a ventilating system, according to a preferred embodiment of the invention.

Referring to FIG. 1, a preferred embodiment of the present invention is shown. The invention comprehends a ventilating system 10 for equalizing differential pressure relationships between a container 12, such as fuel reservoir of a car, and the atmosphere external to the container 12, when the ventilating system 10 is on the container 12. Alternately, the ventilating system 10 may be used between two containers. The ventilating system 10 may be incorporated as a part of a cap to the container 12, which embodiment is described in more detail below. However, it is appreciated that the ventilating system 10 need not be a cap or other commonly removable portion of the container 12. In the embodiment depicted in FIG. 1, the container 12 includes a filler neck or stem 14 that includes a plurality of threads 16. Of course, other means may be used to retain the ventilating system 10 to the container 12. The ventilating system 10 preferably makes a hermetic seal to the container 12, such as at point 11 using an o-ring or a similar method. As depicted in FIG. 1, the container 12 is very small. It is appreciated that this is for convenience in constructing the figure only, and that in actual use, the container 12 may be any size, either smaller than or larger than that depicted in FIG. 1 and may include other features such as additional valves.

The ventilating system 10 preferably includes a body member 18, a rotatable cover member 20, a shearable center pin connector 22, an overpressure relief member 24, an underpressure relief member 26, a first compression member 28 and a second compression member 30. Preferably, the ventilating system 10 is constructed from recyclable materials so that the ventilating system 10 may be recycled and the recycled materials used in subsequent manufacturing operations. Most preferably, all of the components of the ventilating system 10 are formed of the same material. Moreover, it is preferred that the ventilating system 10 be formed of electrically conductive materials such as a carbon-filled plastic. The electrically conductive ventilating system 10 preferably discharges accumulated electrostatic charge from a person touching the ventilating system 10 to the container 12. Thus the electrically conductive ventilating system 10 tends to prevent the inadvertent ignition of flammable materials contained in the container 12 by electrostatic sparks that might otherwise occur after the ventilating system 10 is removed from the container 12.

The body member 18 has an exterior surface 32 adapted to seal against the container 12. Body member 18 preferably includes a plurality of threads 34 for selectively threading into and out of the threaded stem 14 of the container 12. The body member 18 also has an interior surface 36 that forms a conical section 38. The conical section 38 has a width or depth of between about 0.100 inches and about 1.000 inches, a first major diameter 40 of between about 0.250 inches and about 0.800 inches, and a first minor diameter 42 of between about 0.125 inches and about 0.600 inches. As used herein, the term "major diameter" refers to the larger diameter of a conical section, and the term "minor diameter" refers to the smaller diameter of a conical section. The term "conical section" is used to describe a structure shaped like a cone, that may be truncated, or in other words cut off, at the apex. The width of the conical sections described, as the term is used herein, refers to the distance between the major diameter at one end of the conical section and the minor diameter at the other end of the conical section, as measured along the surface of the conical section.

Throughout this specification certain directional indicators are used to more clearly describe the construction and operation of the ventilating system 10. Accordingly, a "first direction" referred to herein indicates a positional relationship between the minor diameter 42 and the major diameter 40. As shown in FIG. 1, the first direction is the direction from the major diameter 40 to the minor diameter 42. Conversely, a "second direction" referred to herein is, in one embodiment, directly opposite to the first direction. Correspondingly, the first major diameter 40 and the first minor diameter 42 of the body member 18 are oriented in the first direction relative to each other.

The body member 18 forms apertures 44 and 46 adjacent to the upper portion 48 and lower portion 50 of the body member, respectively. These apertures 44 and 46 preferably permit fluids, such as liquids, gases, and vapors, to flow through the ventilating system 10 between the container 12 and the surrounding environment, such as the atmosphere. The function of the apertures 44 and 46 is described further below.

The cover member 20 preferably has an upper surface 52, a lower surface 54 and a peripheral edge 56 extending from the lower surface 54 in the first direction. According to a preferred embodiment of the invention, the cover member 20 is formed of electrically conductive recyclable materials. Many cars have metallic filler necks or stems 14 on their gas tanks 12, and in the preferred embodiment of the invention, the peripheral edge 56 of the cover member 20 discharges any accumulated electrostatic charge in the person applying the ventilating system 10 when the cover member 20 contacts the stem 14, discharging the charge through the stem 14. The peripheral edge 56 preferably discharges any accumulated charge from a person to the stem 14 when the peripheral edge 56 comes into contact with the stem 14, thus allowing static electricity to be discharged from the charged person. Since the spark occurs between the contacting cover member 20 and filler neck 14, the person touching the cover member 20 is shielded from feeling any discomfort due to spark discharge. Moreover, the discharge safely "sparks" before the ventilating system 10 is opened and a mixture of air and fuel is released from the container 12.

Cover member 20 forms an aperture or orifice 58 centrally located on cover member 20. The aperture 58 may extend through cover member 20 or, alternately, aperture 58 is centrally located on the lower surface 54 of cover member 20, partially extending into the cover member 20. Aperture 58 is formed to receive the first end 60 of a shearable center pin connector 22. Preferably, the shearable pin 22 is also formed of a recyclable material, similar to the other components of ventilating system 10. The shearable pin 22 may be attached to the body member 18 or to the cover member 20, and the aperture or orifice 58 can likewise be in either the body member 18 or cover member 20.

The shearable pin 22 also has a second end 62 that is preferably attached to a central location on the upper portion 48 of the body member 18. The shearable pin 22 may be attached to the body member 18 by an ultrasonic weld, adhesive, or epoxy resin composition, or may be formed integrally with the body member 18. In yet another embodiment, the shear pin 22 is formed integrally with the cover member 20, and snaps into and spins freely inside of an aperture in the upper portion 48 of the body member 18.

The shearable pin 22 connects cover member 20 to the body member 18, allowing the rotatable cover member 20 to rotate freely with respect to the body member 18. According to a preferred embodiment of the invention, there is preferably a separable distance between the cover member 20 and the body member 18, discussed further below. The shearable pin 22 is designed to shear when the cover member 20 receives a side impact, such as when a car is struck near the gas tank filler neck 14. The shearable pin 22 allows the rotatable cover member 20 to tear from the body member 18 without tearing the body member 18 from the filler neck 14, which would allow gas from the tank 12 to escape more readily from the tank 12 after an accident, and thereby create a safety hazard.

As shown in FIG. 1, cover member 20 preferably includes a first engagement means 64, located on the lower surface 54 near the peripheral edge 56 of the cover member 20. The body member 18 includes a second engagement means 66 located on the upper body portion 48 of the body member 18. The first engagement means 64 and second engagement means 66 operate together to enable the cover member 20 to engage the body member 18 and thereby enable the insertion and removal of the ventilating system 10 into or out of the stem 14. First and second engagement means 64 and 66 respectively may be complimentary sets of ratcheting teeth.

Preferably, the cover member 20 is separated from the body member 18 by a disengagement member 68, such as a spring, so that the first and second engagement means 64 and 66 are not engaged until a force in the first direction is applied to the cover member 20. Separating the cover member 20 from the body member 18, and thereby separating the first engagement means 64 from the second engagement means 66, tends to prevent the ventilating system 10 from inadvertently turning. For example, to insert the ventilating system 10 into a stem 14, a force is applied to the cover member 20 in the first direction, thereby engaging the first and second engagement means 64 and 66, respectively. Once engaged, the cover member 20 is preferably turned in a clockwise direction (relative to the first direction) to tighten the ventilating system 10, for a clockwise oriented threaded body member 18. The ratcheting mechanism is designed to "ratchet" at an optimal torque level, preventing further tightening of the ventilating system 10. To loosen the ventilating system 10, the opposite steps are taken, preferably turning the cover member 20 in a counterclockwise direction (also relative to the first direction).

According to the invention, ventilating system 10 is designed to preferentially equalize or control various differential pressure relationships existing between fluids contained within the container 12 and fluids external to ventilating system 10, when the ventilating system 10 is engaged with the stem 14. Thus, the invention applies to the equalization of gaseous mixtures, such as gasoline vapor and air compositions. However, the invention is not intended to be limited to any particular fluid.

Referring to FIG. 1, an equilibrium condition is illustrated when the underpressure and overpressure relief members, 26 and 24 are engaged, or not venting fluids, with respect to each other. Equilibrium herein is defined as the condition when the first pressure and the second pressure are at predetermined levels such that the overpressure relief member 24 and underpressure relief member 26 are substantially in the configuration as shown in FIG. 1. As described more completely below, this equilibrium condition does not necessarily imply that the first pressure is equal to the second pressure.

According to a preferred embodiment of the invention, a fluid at a first pressure exists within container 12, permeating through apertures 46 of the body member 18, constituting a first volume 70. Similarly, a fluid at a second pressure exists externally to the ventilating system 10. A vent or passageway 72 between the cover member 20 and the body member 18 allows the fluid at the second pressure to permeate through the passageways 72 and apertures 44 constituting a second volume 74.

Under certain operating conditions, it is desirable to allow the fluid in the first volume 70 at the first pressure to permeate into the second volume 74 at the second pressure. Likewise, it may be desirable to allow the fluid in the second volume 74 at the second pressure to permeate into the first volume 70 at the first pressure. Accordingly, the overpressure relief member 24, first compression member 28, underpressure relief member 26, and second compression member 30 operate together to control the amount of fluid allowed from the first volume 70 into the second volume 74, or the amount of fluid allowed from the second volume 74 into the first volume 70. One of the advantages of the present invention is that the ventilating system 10 does not continuously vent fluid from within the first volume 70 to the second volume 74 and thereon to the atmosphere. Correspondingly, when the ventilating system 10 encloses a fuel reservoir 12 of a car, the ventilating system 10 tends to decrease the level of gasoline vapor emissions to a level that is at or below federal regulatory standards, or any other criteria that might be desired.

Figure 2:
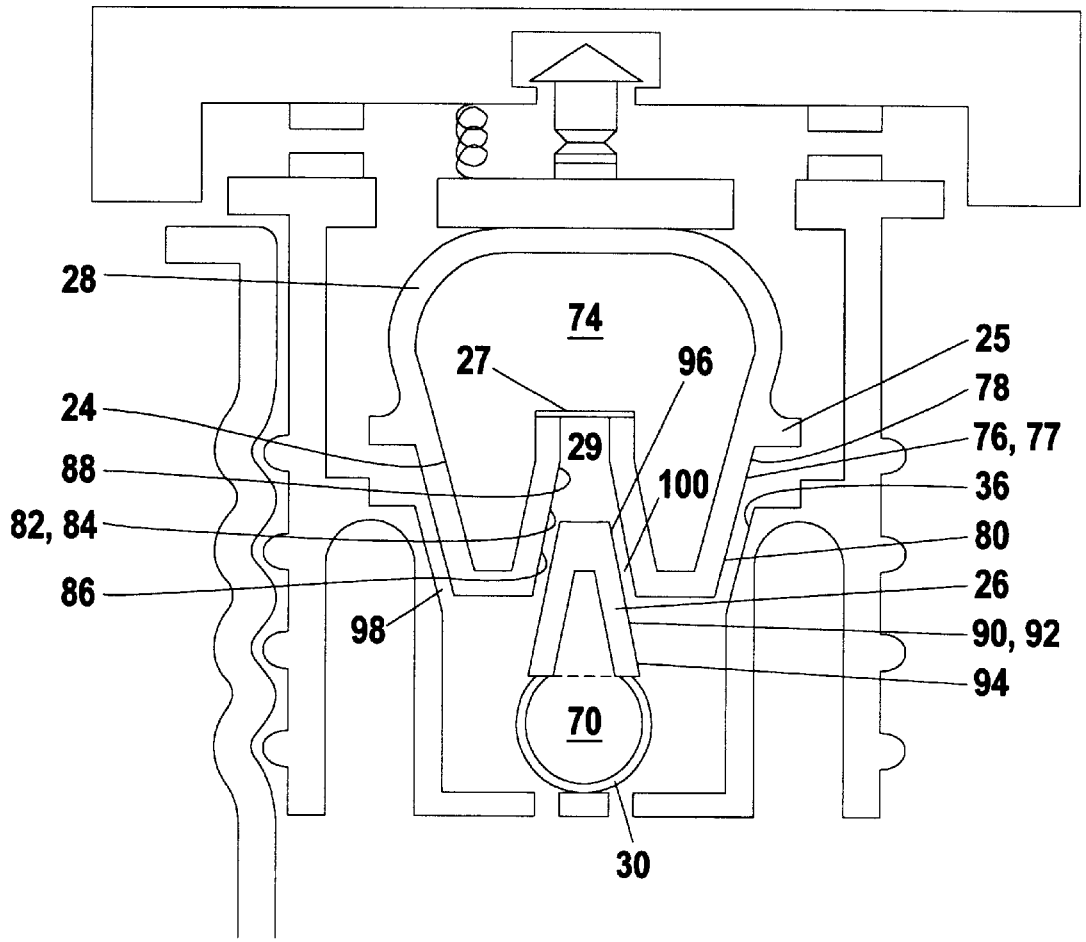
FIG. 2 is a cross-sectional side view of a ventilating system relieving a positive differential pressure in accordance with the invention.

The overpressure relief member 24 controls whether the fluid within the container 12, whether it be a gas, liquid, or vapor, is allowed to escape from the container 12 to the environment of the second volume 74 outside of the container 12 when the first pressure is greater than the sum of the second pressure and the force applied by the first compression member 28. As shown in FIG. 2, the overpressure relief member 24 has an outside surface 76 that forms a conical section 77 having a width of between about 0.100 inches and about 1.000 inches, a first major diameter 78 of between about 0.250 inches and about 0.800 inches, and a first minor diameter 80 of between about 0.125 inches and about 0.600 inches. The first major diameter 78 and the first minor diameter 80 of the overpressure relief member 24 are oriented in the first direction relative to each other, as described above. The overpressure relief member 24 also has an interior surface 82 forming a conical section 84 having a width of between about 0.050 inches and about 0.750 inches, a second major diameter 86 of between about 0.200 inches and about 0.750 inches, and a second minor diameter 88 of between about 0.100 inches and about 0.500 inches. The second major diameter 86 and the second minor diameter 88 of the conical section 84 are oriented in the second direction relative to each other. A filter 27 is selectively disposed adjacent an opening 29 of the interior surface 82 of the overpressure relief member 24. The filter 27 tends to prevent any unwanted particulate matter or other such contaminants from entering the second volume 74. The interior surface 82 of the overpressure relief member 24 operates in cooperation with other elements of the ventilating system 10, as described below.

The first compression member 28 preferably functions to apply a force against the overpressure relief member 24, thus urging the overpressure relief member 24 in the first direction. In alternate embodiments, the first compression member 28 is either a separate component from the overpressure relief member 24 or formed as part of the overpressure relief member 24. The first compression member 28 may be formed as a domed, curved, coiled, or any spring-like configured component that applies a force against the overpressure relief member 24 in the first direction. Alternately, the first compression member 28 is formed of strips or leaves of material that are configured to provide a force against the overpressure relief member 24 in the first direction. Again, it is most preferable that all of the components of ventilating system 10 are formed of the same recyclable material.

As described above, the first compression member 28 provides a force against the overpressure relief member 24 in the first direction, driving the overpressure relief member 24 in the first direction and thereby sealing the outside surface 76 of the overpressure relief member 24 against the interior surface 36 of the body member 18. The width and diameters of the outside surface 76 of the overpressure relief member 24 and the width and diameters of the interior surface 36 of the body member 18 provide a substantially greater surface area for sealing than do traditional gaskets or o-rings. Thus, the seal between the interior surface 36 of the body member 18 and the outer surface 76 of the overpressure relief member 24 tends to provide a more robust seal than traditional gaskets or o-rings due to the larger surface areas of the two surfaces when they are mated against one another. This tends to reduce the need for more traditional types of gaskets between the interior surface 36 of the body member 18 and the outside surface 76 of the overpressure relief member 24. As will be described below with reference to FIG. 4, the outer surface 76 may also be configured to allow pressure losses to occur across a series of seals, thus minimizing leakage. In this manner, all of the components of the ventilating system 10 are preferably formed of the same recyclable material, and yet still form tight seals that prevent continual venting of the contents of container 12.

In an alternate embodiment of the invention, the overpressure relief member has a peripheral edge or lip 25 located near the outside surface 76 in the area near the first major diameter 78. In this embodiment, the body member 18 forms a recess 19 for accommodating the peripheral edge 25 of the overpressure relief member 24. When the outside surface 76 of the overpressure relief member 24 is fully seated within the interior surface 36 of the body member 18, the peripheral edge 25 contacts the body member 18 within the recess 19. The peripheral edge provides additional sealing surface area. When the interior diameter of the recess 19 is matched very closely with the outer diameter of the peripheral edge 25, a greater pressure differential is required in order to disengage the overpressure relief member 24 from the body member 18. Resultantly, the overpressure relief member 24 acts like a poppet valve when the pressure differential required to overcome the additional sealing surfaces between the peripheral edge 25 and recess 19. That is, when the pressure differential becomes great enough to impel the overpressure relief member 24 in the second direction, the overpressure relief member floats until the pressure differential no longer exists. Furthermore, the peripheral edge 25 and associated recess 19 also tend to prevent the overpressure relief member 24 from wedging too far into the body member 18 and binding against the interior surface 36 of the body member 18.

As mentioned above, the first compression member 28 applies an amount of force or pressure in the first direction to the overpressure relief member 24. The ventilating system 10 is designed to vent fluid, such as a gas, from within the first volume 70 via the overpressure relief member 24 to the second volume 74 when a first pressure within the first volume 70 is large enough to overcome the sum of the force applied by the first compression member 28 and the second pressure applied by the second volume 74.

As shown in FIG. 2, once the first pressure exceeds the sum of the second pressure and the applied force of the first compression member 28, the first compression member 28 compresses, which enables the overpressure relief member 24 to move in the second direction and create a first gap or passageway 98 between the outside surface 76 of the overpressure relief member 24 and the interior surface 36 of the body member 18. In this manner, the fluid within the first volume 70, which is at a higher pressure than the fluid within the second volume 74, tends to flow under the impetus of the pressure differential from the first volume 70 within the container 12 through the gap 98 and into the second volume 74 outside of the container 12. This flow tends to continue until the first pressure within the first volume 70 is diminished by the loss of fluid within the container 12 to the point where the first pressure within the first volume 70 is no more than the sum of the force applied against the overpressure relief member 24 in the first direction by the first compression member 28 and the second pressure in the second volume 74.

Starting at a point in time when the first pressure within the first volume 70 is about equal to the sum of the force applied against the overpressure relief member 24 in the first direction by the first compression member 28 and the second pressure in the second volume 74, the force applied against the overpressure relief member 24 in the first direction by the first compression member 28 urges the overpressure relief member 24 in the first direction toward the interior surface 36 of the body member 18, until the outer surface 76 of the overpressure relief member 24 once again engages the interior surface 36 of the body member 18. When this occurs, the seal between the outer surface 76 of the overpressure relief member 24 and the interior surface 36 of the body member 18 is once again complete, and the first volume 70 is isolated from the second volume 74.

It is comprehended that adjusting the amount of force that the first compression member 28 applies in the first direction against the overpressure relief member 24 is one way to determine how large a pressure differential must exist between the first volume 70 inside of the container 12 and the second volume 74 outside of the container before the overpressure relief member 24 moves in the second direction venting fluids from the first volume 70, thereby at least partially equalizing the pressure differential. For example, by increasing the amount of force applied by the first compression member 28 against the overpressure relief member 24, such as by using a relatively stronger spring as the first compression member 28, the pressure differential between the first volume 70 and the second volume 74 must be relatively greater before it will be vented, because the first pressure within the first volume 70 must overcome the additional relatively greater force of the first compression member 28. On the other hand, by decreasing the amount of force applied by the first compression member 28 against the overpressure relief member 24, such as by using a relatively weaker spring as the first compression member 28, the pressure differential between the first volume 70 and the second volume 74 may be relatively less before it will be vented, because the first pressure within the first volume 70 must overcome the relatively lesser force of the first compression member 28.

In one embodiment, a second gap or passageway 100 is also created between the interior surface 82 of the overpressure relief member 24 and outside surface 90 of the underpressure relief member 26 when the overpressure relief member 24 moves in the second direction. The second gap 100 also allows the fluid from within the first volume 70 to escape through the passageways 98 and 100 into the second volume 74.

In an alternate embodiment, the outside surface 90 of the underpressure relief member 26 remains engaged with the interior surface 82 of the overpressure relief member 24. In this embodiment, only the passageway 98 is opened when the first compression member 28 compresses and the overpressure relief member 24 moves in the second direction. Once the first pressure decreases to an amount so that the sum of the second pressure and the force applied by the first compression member 28 is no less than the first pressure, the first compression member 28 expands, applying a force to the overpressure relief member 24 in the first direction, thereby sealing the passageways 98 and 100 that may be open, as described above.

The ventilating system 10 also includes an underpressure relief member 26 for cooperatively controlling the flow of fluids, such as air, into the container 12 when the second pressure is greater than the sum of the first pressure and the force applied by the second compression member 30. The underpressure relief member 26 has an outside surface 90 that forms a conical section 92. The conical section 92 has a width of between about 0.050 inches and about 0.750 inches, a second major diameter 94 of between about 0.200 inches and about 0.750 inches, and a second minor diameter 96 of between about 0.100 inches and about 0.500 inches. The second major diameter 94 and the second minor diameter 96 of the conical section 92 are oriented in the second direction relative to each other.

Figure 3:
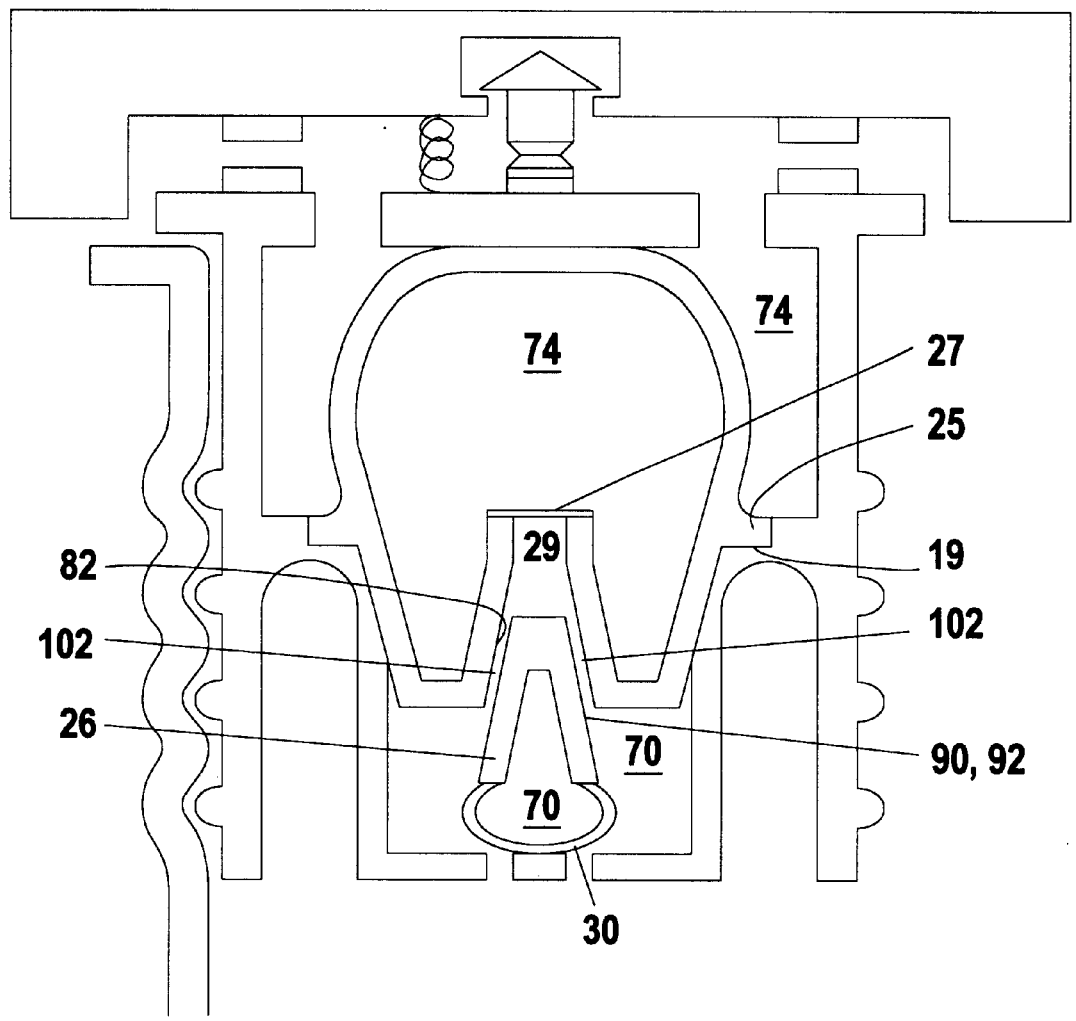
FIG. 3 is a cross-sectional side view of a ventilating system relieving a negative differential pressure in accordance with the invention.

Referring to FIG. 3, the second compression member 30 preferably functions in a manner similar to that as described above for the first compression member 28. As described above for the first compression member 28, the second compression member 30 may be a separate component from the underpressure relief member 26 or formed as an integral unit with the underpressure relief member 26. Similarly, it is preferable that the second compression member 30 is likewise formed of the same recyclable materials as the other components of ventilating system 10. The second compression member 30 applies a force in the second direction to the underpressure relief member 26, driving the underpressure relief member 26 in the second direction and thereby sealing the outside surface 90 of the underpressure relief member 26 against the interior surface 82 of the overpressure relief member 26 when the second pressure is no more than the sum of the force provided by the second compression member 30 and the first pressure against the underpressure relief member 26.

The ventilating system 10 vents fluid, such as air, from the second volume 74 to the first volume 70 when the second pressure within the second volume 74 is large enough to overcome the sum of the force of the second compression member 30 and the first pressure within the first volume 70. In this manner, the underpressure relief member 26 operates in much the same manner as the overpressure relief member 24, as described above. Thus, the discussion provided above in regard to the operation of the overpressure relief member 24 is applicable to the theory of operation of the underpressure relief member 26. However, for the purpose of clarity, some of the operation of the underpressure relief member 26 is explained in more detail below.

As shown in FIG. 3, once the second pressure is at least no less than the sum of the first pressure and the force applied by the second compression member 30, the second compression member 30 compresses in the first direction, enabling the underpressure relief member 26 to move in the first direction, thereby opening the second gap or passageway 100 between the outside surface 90 of the underpressure relief member 26 and the interior surface 82 of the overpressure relief member 24, thereby allowing the gas from the second volume 74 to pass through the gap 100 into the first volume 70. As gas enters the first volume 70 from the second volume 74, the first pressure within the first volume 70 tends to increase. When the sum of the first pressure in the first volume 70 and the force applied by the second compression member 30 in the second direction against the underpressure relief member 26 is no longer less than the second pressure in the second volume 74, the second compression member 30 drives the underpressure relief member 26 in the second direction, thereby sealing the passageway 100, similar to that as described above.

Figure 4:
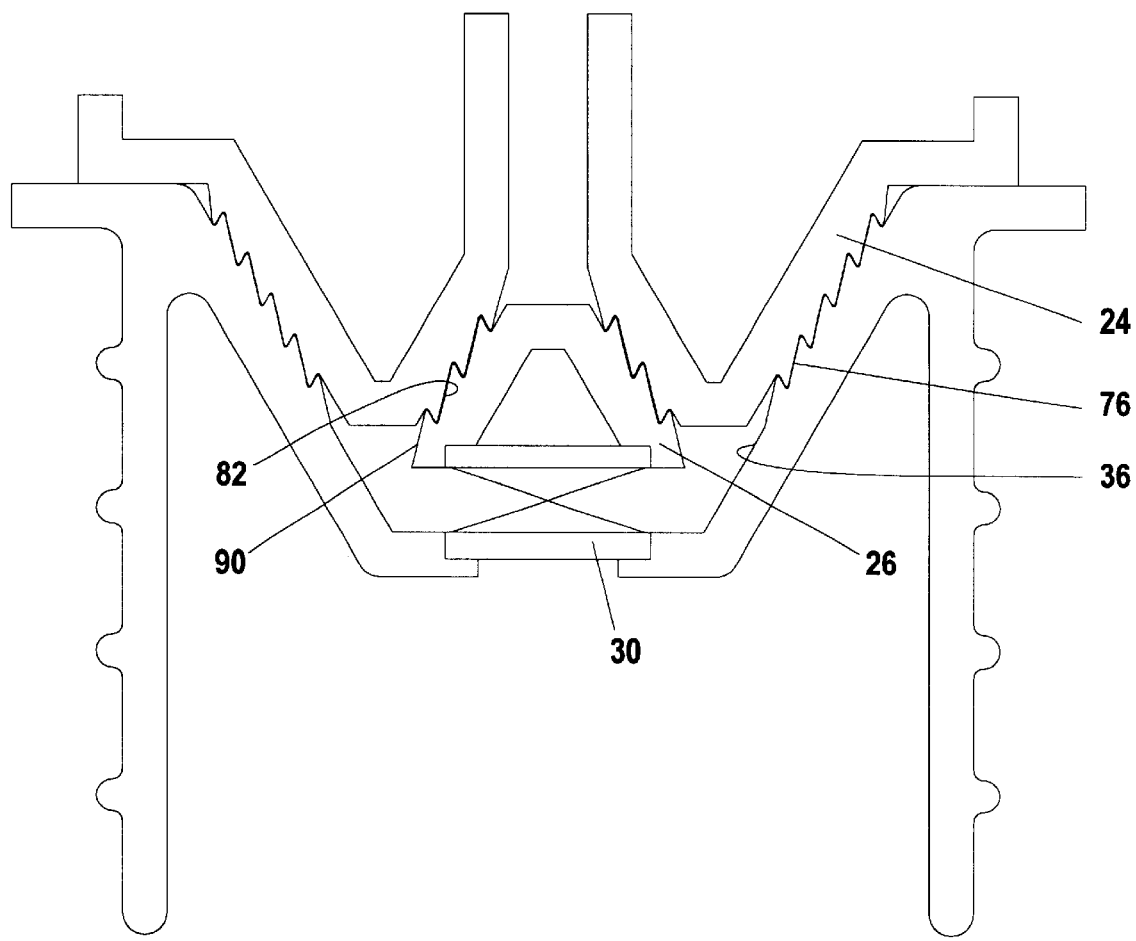
FIG. 4 is a partial cross-sectional side view of another embodiment of a ventilating system in accordance with the invention.
Figure 5:
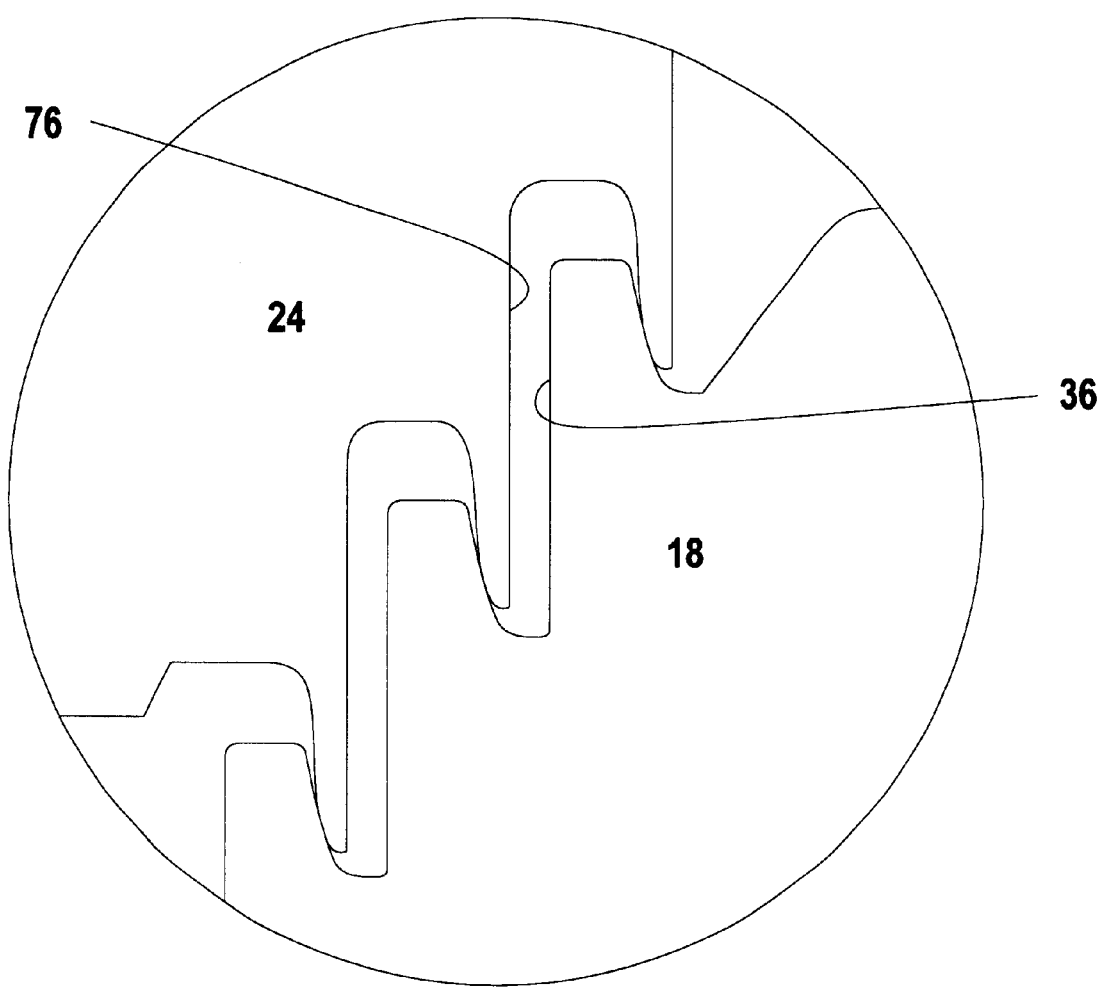
FIG. 5 is a cross-sectional view of a portion of the ventilating system of FIG. 4.

Referring to FIGS. 4 and 5, an alternative embodiment of the invention is shown. In the embodiment depicted in FIGS. 4 and 5, the large mating surfaces of the overpressure relief member 24, underpressure relief member 26 and body member 18 are formed in a discontiguous configuration. For example, the outside surface 76 of the overpressure relief member 24 is discontiguous, as best shown in FIG. 5. Likewise the interior surface 36 of the body member 18 is discontiguous. In this alternative arrangement, there are now multiple seals formed by multiple sealing surfaces at the opposing discontiguous mating surfaces 76 and 36 of the overpressure relief member 24 and body member 18, respectively. The multiple sealing surfaces unitedly perform the function of the large contiguous sealing surfaces of the embodiments described above. This configuration also provides redundant sealing rings, which may tend to increase the likelihood of forming a perfect seal.

Similarly, the outside surface 90 of the underpressure relief member 26 and the interior surface 82 of the overpressure relief member 24 may be discontiguously formed, functioning as described above. Alternatively, the outside surface 76 and the interior surface 36 of the overpressure relief member 24 and body member 18 may be discontiguously formed, whereas the outside surface 90 of the underpressure relief member 26 and the interior surface 82 of the overpressure relief member 24 are contiguously formed. Likewise, the outside surface 76 and the interior surface 36 of the overpressure relief member 24 and body member 18 may be contiguously formed, whereas the outside surface 90 of the underpressure relief member 26 and the interior surface 82 of the overpressure relief member 24 are discontiguously formed.

The discussion above makes clear that the invention provides a means for a range of pressure differentials to exist before the ventilating system 10 allows gas from one of the volumes, either the first volume 70 or the second volume 74, to vent into the other. In other words, by selecting the strengths of the first compression member 28 and the second compression member 30, either a greater or a lesser pressure differential must exist between the first volume 70 and the second volume 74 before the ventilating system 10 allows any venting to occur either in the first direction or the second direction. Further, these pressure differentials need not be the same in the first direction and the second direction in order for venting to occur in that direction.

For example, in one embodiment it may be desired that there be an overpressure of twenty pounds per square inch within the first volume relative to the second volume before the ventilating system 10 allows gasoline vapors in the fuel tank 12 to vent to the atmosphere. In other words, the first pressure inside the fuel tank 12 must be 20 psi greater than the atmospheric pressure before the ventilating system 10 vents the pressure inside the fuel tank 12 into the atmosphere. Further, it may be desired that an underpressure of forty pounds per square inch exist within the first volume relative to the second volume before the ventilating system 10 allows air from the atmosphere to vent into the fuel tank 12. In other words, the first pressure inside the fuel tank 12 must be 40 psi less than the atmospheric pressure before the ventilating system 10 vents the air in the atmosphere into the fuel tank 12. It is appreciated that these numeric values and units of pressure are exemplary only, and that other values and units are also comprehended.

In the example given above, the first compression member 28, which cooperatively sets the amount of overpressure that must exist before the first pressure within the first volume 70 is vented to the second volume 74, is selected to provide a force necessary to counterbalance a 20 psi pressure against the overpressure relief member 24, before the first compression member 28 deforms and allows the overpressure relief member 24 to move in the second direction and allow vapors to escape from the first volume 70 within the container 12. It is appreciated that the force selected for the first compression member 28 may also need to take into account the force of the second compression means 30, which in some embodiments of the invention is also working against the first compression member 28.

Depending upon the amount of pressure differential that the ventilating system 10 is designed to withstand prior to allowing venting to occur in either the first direction or the second direction, the widths of the various sealing surfaces may be selectively larger or smaller. This is based on the concept that a smaller amount of mating surface area may be required to provide a seal against a lower pressure differential, but a larger amount of mating surface area may be required to provide a seal against a higher pressure differential. Thus, ventilating systems 10 designed for lower pressure differentials may tend to have component widths in the lower ranges of those described above, while ventilating systems 10 designed for higher pressure differentials may tend to have component widths in the higher ranges of those described above. Alternately, the orientation of the overpressure and underpressure relief members 24 and 26 may be reversed to allow greater fluid flow in the opposite direction.

Similarly, the second compression member 30, which cooperatively sets the amount of underpressure that must exist before the second pressure within the second volume 74 is vented into the first volume 70, is selected to provide a force necessary to counterbalance a 40 psi pressure against the underpressure relief member 26, before the second compression member 30 deforms and allows the underpressure relief member 26 to move in the first direction and allow air from the atmosphere of the second volume 74 to enter into the container 12. Because of the retaining tabs 25, the force selected for the second compression member 30 does not need to take into account the force exerted by the first compression member 28.

In accordance with the invention, recycling ventilating system 10 is a straightforward procedure. Since all of the components of ventilating system 10 are preferably made from recyclable components, ventilating system 10 does not need to be disassembled prior to recycling. Thus, the ventilating system 10 may be recycled as an unassembled unit. Alternately, if different recyclable materials are used for various components, ventilating system 10 is easily disassembled without the need for elaborate disassembling machinery and the constituent components may be recycled individually.

Having described various aspects and embodiments of the invention, and several advantages thereof, it will be recognized by those of ordinary skills that the invention is susceptible to various modifications, substitutions and revisions within the spirit and scope of the appended claims. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A ventilating system for equalizing a first pressure within an enclosure and a second pressure outside of the enclosure, the ventilating system comprising:

a body member having an exterior surface adapted to seal against the enclosure, the body member also having an interior surface, the interior surface forming a conical section having a width and a first major diameter and a first minor diameter, the first major diameter and the first minor diameter oriented in a first direction relative to each other, an overpressure relief member for venting fluids from within the enclosure when the first pressure is greater than the second pressure, the overpressure relief member having an outside surface that forms a conical section having a width and a first major diameter and first minor diameter, the first major diameter and the first minor diameter of the overpressure relief member oriented in the first direction relative to each other, the outside surface of the overpressure relief member for separating from the interior surface of the body member when the first pressure is greater than the second pressure, and the outside surface of the overpressure relief member for sealing more tightly against the interior surface of the body member when the first pressure is less than the second pressure, the overpressure relief member also having an interior surface, the interior surface forming a conical section having a width and a second major diameter and a second minor diameter, the second major diameter and the second minor diameter oriented in a second direction relative to each other, and an underpressure relief member for receiving fluids into the enclosure when the first pressure is less than the second pressure, the underpressure relief member having an outside surface that forms a conical section having a width and a second major diameter and second minor diameter, the second major diameter and the second minor diameter of the underpressure relief member oriented in the second direction relative to each other, the outside surface of the underpressure relief member for separating from the interior surface of the overpressure relief member when the first pressure is less than the second pressure, and the outside surface of the underpressure relief member for sealing more tightly against the interior surface of the overpressure relief member when the first pressure is greater than the second pressure.

2. The ventilating system of claim 1, further comprising a first compression member for applying a third pressure in the first direction to the overpressure relief member, thereby engaging the width of the outside surface of the overpressure relief member with the width of the interior surface of the body member when the first pressure is not more than a sum of the second pressure and the third pressure.

3. The ventilating system of claim 2, wherein the first compression member compresses when the first pressure is greater than the sum of the second pressure and the third pressure, permitting the outside surface of the overpressure relief member to disengage in the second direction from the interior surface of the body member creating a first gap, thereby relieving the first pressure through the first gap until the first pressure is not more than the sum of the second pressure and the third pressure.

4. The ventilating system of claim 1, further comprising a second compression member for applying a fourth pressure in the second direction to the underpressure relief member, thereby engaging the width of the outside surface of the underpressure relief member with the width of the interior surface of the overpressure relief member when the second pressure is not more than a sum of the first pressure and the fourth pressure.

5. The ventilating system of claim 4, wherein the second compression member compresses when the second pressure is greater than the sum of the first pressure and the fourth pressure, permitting the outside surface of the underpressure relief member to disengage in the first direction from the interior surface of the overpressure relief member creating a second gap, thereby relieving the second pressure through the second gap until the second pressure is not more than the sum of the first pressure and fourth pressure.

6. The ventilating system of claim 1, wherein the width of the interior surface of the body member is between about 0.100 inches and about 1.000 inches.

7. The ventilating system of claim 1, wherein the width of the exterior surface of the overpressure relief member is between about 0.100 inches and about 1.000 inches, and the width of the interior surface of the overpressure relief member is between about 0.050 inches and about 0.750 inches.

8. The ventilating system of claim 1, wherein the width of the exterior surface of the underpressure relief member is between about 0.050 inches and about 0.750 inches.

9. The ventilating system of claim 1, wherein the second direction is oriented at one-hundred and eighty degrees relative to the first direction.

10. The ventilating system of claim 1, wherein the first major diameter of the body member is between about 0.250 inches and about 0.800 inches, and the first minor diameter of the body member is between about 0.125 inches and about 0.600 inches.

11. The ventilating system of claim 1, wherein the first major diameter of the overpressure relief member is between about 0.250 inches and about 0.800 inches, the first minor diameter of the overpressure relief member is between about 0.125 inches and about 0.600 inches, the second major diameter of the overpressure relief member is between about 0.200 inches and about 0.750 inches, and the second minor diameter of the overpressure relief member is between about 0.100 inches and about 0.500 inches.

12. The ventilating system of claim 1, wherein the second major diameter of the underpressure relief member is between about 0.200 inches and about 0.750 inches, and the second minor diameter of the underpressure relief member is between about 0.100 inches and about 0.500 inches.

13. The ventilating system of claim 1, wherein the exterior surface of the body member has threads for releasably engaging with a threaded stem of the enclosure.

14. The ventilating system of claim 13, further comprising:
a center pin connector, having a first end and a second end, the second end connected to the body member, and
a rotatable cover member rotatably connected to the first end of the center pin connector, the rotatable cover member including a first engagement means for engaging a second engagement means on the body member, the first engagement means engaging the second engagement means when a force is applied to the rotatable cover member, the first and second engagement means for selectively engaging and disengaging the body member with the threaded stem of the enclosure.

15. The ventilating system of claim 14, wherein the center pin connector is shearable for detaching the rotatable cover member from the body member when the rotatable cover member receives a side impact.

16. The ventilating system of claim 1, wherein the ventilating system is formed of recyclable materials.

17. The ventilating system of claim 1, wherein the ventilating system is formed of electrically conductive materials for discharging electrostatic charge from the enclosure through the ventilating system.

18. The ventilating system of claim 1, wherein at least one set of the interior surface of the body member and the exterior surface of the overpressure relief member, and the interior surface of overpressure relief member and the exterior surface of the underpressure relief member have discontiguous surfaces.

19. A fuel ventilating system composed of electrically conductive material for discharging accumulated electrostatic charge, the fuel ventilating system for equalizing a first pressure within a fuel reservoir and a second pressure outside of the fuel reservoir, the fuel ventilating system comprising:
a body member having threads for releasably engaging the ventilating system with a threaded stem of the fuel reservoir, the body member having an exterior surface adapted to seal against the fuel reservoir, the body member also having an interior surface, the interior surface forming a conical section having a width and a first major diameter and a first minor diameter, the first major diameter and the first minor diameter oriented in a first direction relative to each other,
an overpressure relief member for venting gas vapor from within the fuel reservoir when the first pressure is greater than the second pressure, the overpressure relief member having an outside surface that forms a conical section having a width and a first major diameter and first minor diameter, the first major diameter and the first minor diameter of the overpressure relief member substantially equal to the first major diameter and the first minor diameter of the interior surface of the body member respectively, the first major diameter and the first minor diameter of the overpressure relief member oriented in the first direction relative to each other, the outside surface of the overpressure relief member for separating from the interior surface of the body member when the first pressure is greater than the second pressure, and the outside surface of the overpressure relief member for sealing more tightly against the interior surface of the body member when the first pressure is less than the second pressure, the overpressure relief member also having an interior surface, the interior surface forming a conical section having a width and a second major diameter and a second minor diameter, the second major diameter and the second minor diameter oriented in a second direction relative to each other,
an underpressure relief member for receiving air into the fuel reservoir when the first pressure is less than the second pressure, the underpressure relief member having an outside surface that forms a conical section having a width and a second major diameter and second minor diameter, the second major diameter and the second minor diameter of the underpressure relief member substantially equal to the second major diameter and the second minor diameter of the interior surface of the overpressure relief member respectively, the second major diameter and the second minor diameter of the underpressure relief member oriented in the second direction relative to each other, the outside surface of the underpressure relief member for separating from the interior surface of the overpressure relief member when the first pressure is less than the second pressure, and the outside surface of the underpressure relief member for sealing more tightly against the interior surface of the overpressure relief member when the first pressure is greater than the second pressure, a first compression member for applying a third pressure in the first direction to the overpressure relief member, thereby engaging the width of the outside surface of the overpressure relief member with the width of the interior surface of the body member when the first pressure is not more than a sum of the second pressure and the third pressure, wherein the first compression member compresses when the first pressure is greater than the sum of the second pressure and the third pressure, permitting the outside surface of the overpressure relief member to disengage in the second direction from the interior surface of the body member creating a first gap, thereby venting gas vapor through the first gap until the first pressure is not more than the sum of the second pressure and the third pressure, a second compression member for applying a fourth pressure in the second direction to the underpressure relief member, thereby engaging the width of the outside surface of the underpressure relief member with the width of the interior surface of the overpressure relief member when the second pressure is not more than a sum of the first pressure and the fourth pressure, wherein the second compression member compresses when the second pressure is greater than the sum of the first pressure and the fourth pressure, permitting the outside surface of the underpressure relief member to disengage in the first direction from the interior surface of the overpressure relief member creating a second gap, thereby receiving air through the second gap until the second pressure is not more than the sum of the first pressure and fourth pressure, a shearable center pin connector, having a first end and a second end, the second end connected to the body member, and a rotatable cover member rotatably connected to the first end of the center pin connector, the rotatable cover member including a first engagement means for engaging a second engagement means on the body member, the first engagement means engaging the second engagement means when a force is applied to the rotatable cover member, the first and second engagement means for selectively engaging and disengaging the body member with the threaded stem of the enclosure, the shearable center pin connector for shearing when the rotatable cover member receives a side impact, thereby causing the rotatable cover member to detach from the body member.

20. A ventilating system formed of recyclable materials for equalizing a first pressure within a container and a second pressure outside of the container, the ventilating system comprising:

a body member having an exterior surface adapted to seal against the container, the body member also having an interior surface, the interior surface forming a conical section having a width and a first major diameter and a first minor diameter, the first major diameter and the first minor diameter oriented in a first direction relative to each other, a overpressure relief member for venting fluid from within the container when the first pressure is greater than the second pressure, the overpressure relief member having an outside surface that forms a conical section having a width and a first major diameter and first minor diameter, the first major diameter and the first minor diameter of the overpressure relief member oriented in the first direction relative to each other, the outside surface of the overpressure relief member for separating from the interior surface of the body member when the first pressure is greater than the second pressure, and the outside surface of the overpressure relief member for sealing more tightly against the interior surface of the body member when the first pressure is less than the second pressure, the overpressure relief member also having an interior surface, the interior surface forming a conical section having a width and a second major diameter and a second minor diameter, the second major diameter and the second minor diameter oriented in a second direction relative to each other, the overpressure relief member further including a first compression member operable to actuate the overpressure relief member applying a third pressure in the first direction, thereby engaging the width of the outside surface of the overpressure relief member with the width of the interior surface of the body member when the first pressure is not more than a sum of the second pressure and the third pressure, and an underpressure relief member for receiving a fluid into the container when the first pressure is less than the second pressure, the underpressure relief member having an outside surface that forms a conical section having a width and a second major diameter and second minor diameter, the second major diameter and the second minor diameter of the underpressure relief member oriented in the second direction relative to each other, the outside surface of the underpressure relief member for separating from the interior surface of the overpressure relief member when the first pressure is less than the second pressure, and the outside surface of the underpressure relief member for sealing more tightly against the interior surface of the overpressure relief member when the first pressure is not less than the second pressure, the underpressure relief member including a second compression member operable to actuate the underpressure relief member applying a fourth pressure in the second direction, thereby engaging the width of the outside surface of the underpressure relief member with the width of the interior surface of the overpressure relief member when the second pressure is not more than a sum of the first pressure and the fourth pressure.

* * * * *